United States Patent [19]
Tabor

[11] 3,711,892
[45] Jan. 23, 1973

[54] CLOSURE COUNTERBALANCE
[75] Inventor: Paul C. Tabor, Clawson, Mich.
[73] Assignee: Meteor Research Limited, Roseville, Mich.
[22] Filed: Nov. 7, 1969
[21] Appl. No.: 874,798

[52] U.S. Cl. ..................16/76, 188/67, 248/354
[51] Int. Cl. ...............................................E05f 1/08
[58] Field of Search..........16/66, 72, 49, 71, 140, 65, 16/1, 85, 190, 193; 74/531; 188/67, 102; 248/354, 355; 248/402, 403, 114

[56] References Cited

UNITED STATES PATENTS

| | | | |
|---|---|---|---|
| 1,999,844 | 4/1935 | McElroy | 248/414 |
| 2,957,187 | 10/1960 | Raia | 5/317 |
| 1,480,788 | 1/1924 | Sordillo | 248/414 |
| 2,797,119 | 6/1957 | Hollansworth | 292/275 |
| 3,230,595 | 1/1966 | Kedem | 188/67 |
| 3,249,180 | 5/1966 | Torossian | 188/67 |
| 3,278,979 | 10/1966 | Clement | 16/66 |

FOREIGN PATENTS OR APPLICATIONS

| | | | |
|---|---|---|---|
| 857,756 | 1/1961 | Great Britain | |
| 1,249,465 | 11/1960 | France | 188/102 |
| 464,202 | 12/1951 | Italy | 188/102 |

*Primary Examiner*—Bobby R. Gay
*Assistant Examiner*—Garry Moore
*Attorney*—Bacon & Thomas

[57] ABSTRACT

Two telescopically related tubes to be secured at their outer ends to a closure and closure support, respectively. A compression spring within the tubes urges them apart and stop means limit the extension of the device. In one form, a helical torsion spring between the tubes is fixed at one end to the outer tube and normally contracts to frictionally grip the inner tube. A rotatable sleeve is connected to the other end of the spring so it can be manually expanded to release its grip on the inner tube.

9 Claims, 9 Drawing Figures

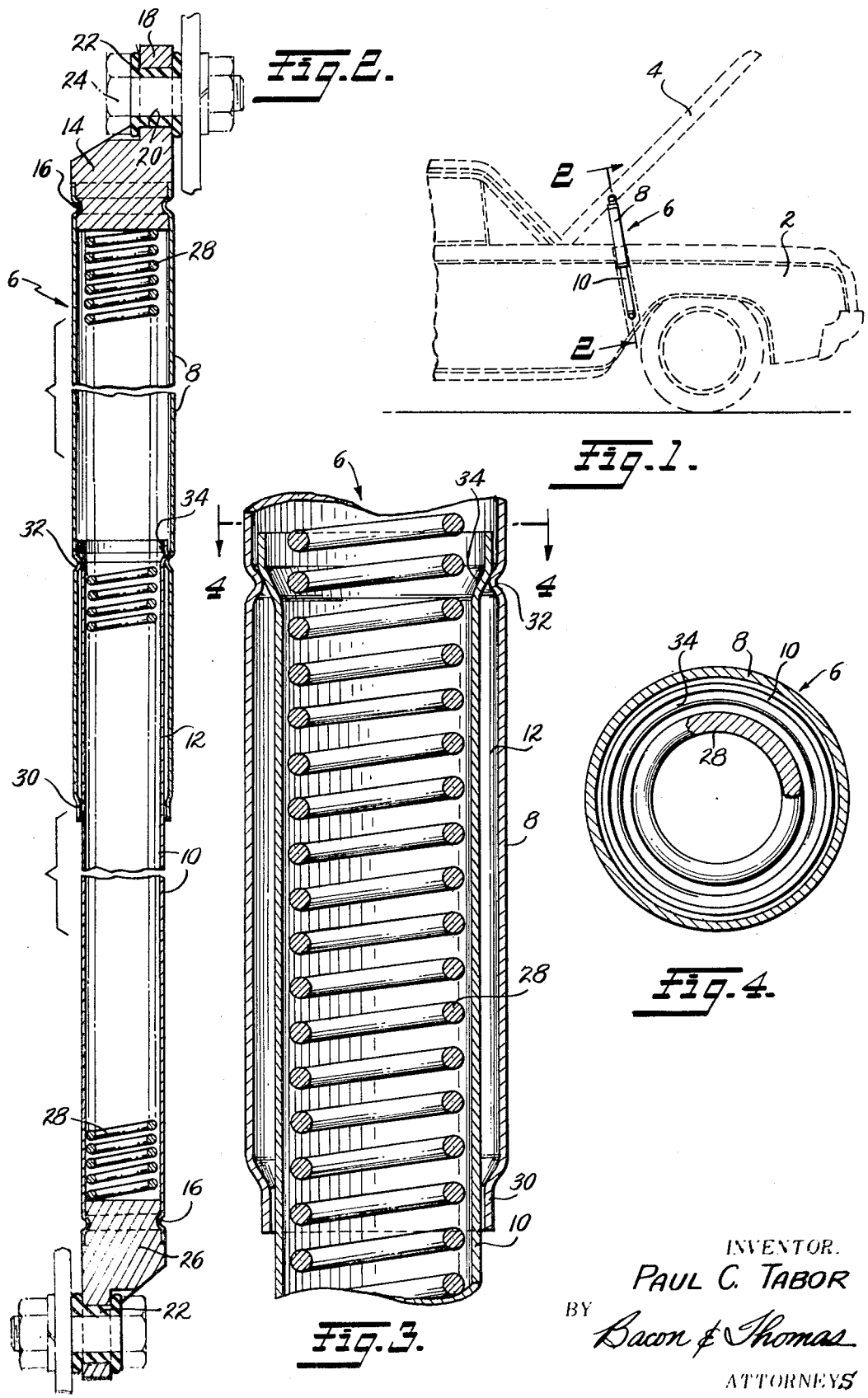

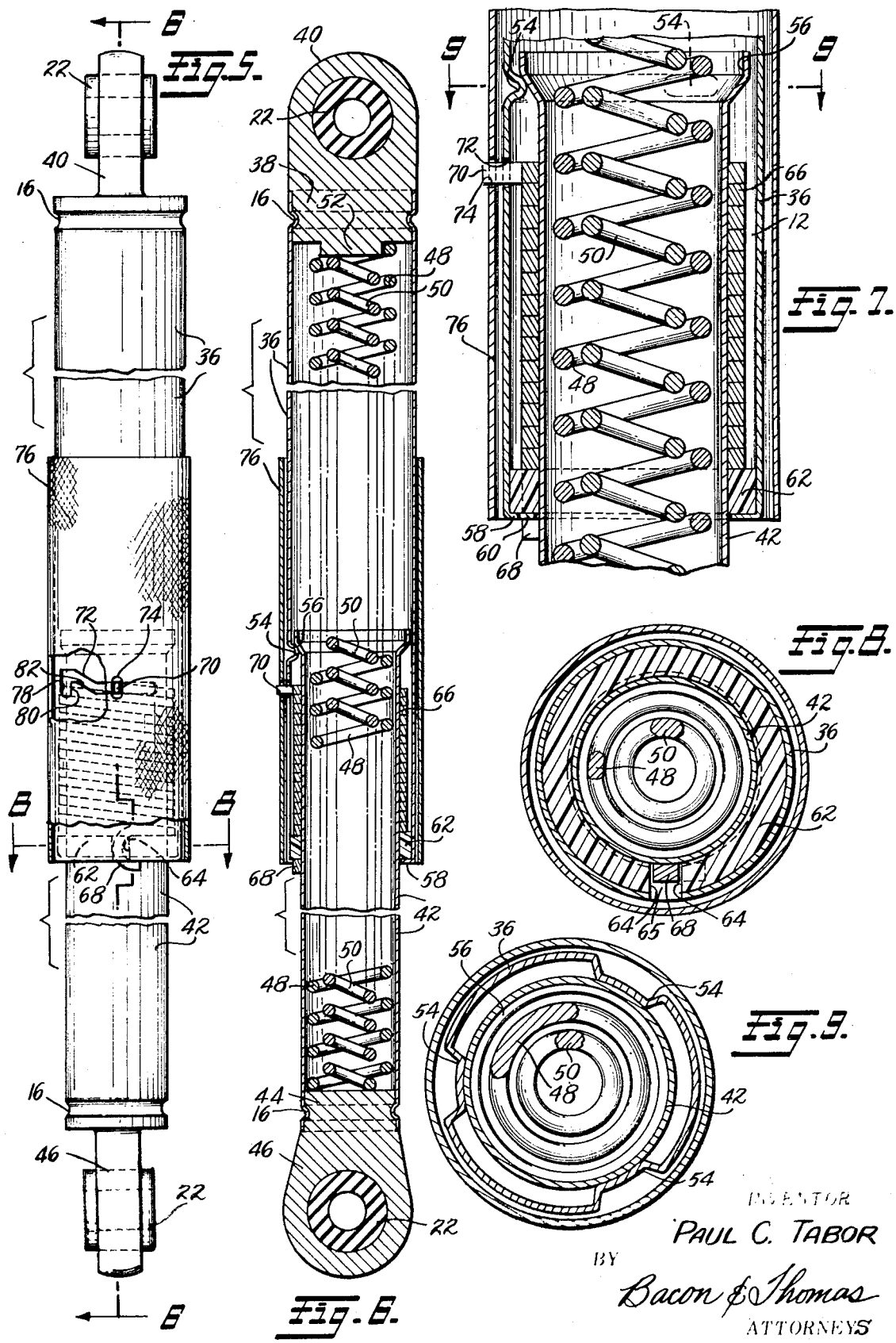

CLOSURE COUNTERBALANCE

BACKGROUND OF THE INVENTION

This invention is in the field of counterbalancing devices and particularly such devices having means for locking the counterbalanced member in a desired position.

In many instances it is desirable to counterbalance the weight of a movable closure and to hold the closure safely in its open position. Such closures as automobile hoods, trunk lids, tail gates, etc. are relatively heavy, must be counterbalanced and should be able to be locked in open position to protect persons thereunder. Prior counterbalancing devices have been quite bulky and expensive and locking means used have not been completely reliable.

SUMMARY OF THE INVENTION

The present invention comprises generally a telescopically extensible member or strut having a compression spring therein to resiliently urge the device to elongate, and stop means to limit elongation. The invention also contemplates manually and selectively operable locking means to lock the telescoping parts together to thus define a temporarily rigid and substantially inextensible strut for securely holding a closure in fully or partly open position while still being able to be forcibly collapsed to prevent damage to the strut and/or the closure.

The disclosure is specifically directed to such a device as contemplated for automotive use but it will be obvious that its application is more general, for example, for doors, hatches, windows, freezer or chest lids and many others.

BRIEF DESCRIPTION OF THE DRAWINGS

FIG. 1 is a schematic view showing one type of use for the present invention;

FIG. 2 is a longitudinal sectional view taken along the line 2—2 of FIG. 1;

FIG. 3 is a further enlarged sectional view of the midportion of FIG. 2;

FIG. 4 is a transverse sectional view taken on the line 4—4 of FIG. 3;

FIG. 5 is a side elevational view, with parts being broken away, of a further embodiment of the invention;

FIG. 6 is a longitudinal sectional view taken substantially on the line 6—6 of FIG. 5;

FIG. 7 is an enlarged sectional view of the intermediate portion of FIG. 6;

FIG. 8 is an enlarged transverse sectional view taken on the line 8—8 of FIG. 5; and FIG. 9 is a transverse sectional view taken on the line 9—9 of FIG. 7.

DESCRIPTION OF THE PREFERRED EMBODIMENTS

FIG. 1 illustrates a contemplated use for the present invention wherein a vehicle 2, shown in dotted line, is provided with a conventional hinged hood 4. The counterbalance 6 of the present invention may be mounted as indicated in FIG. 1 and serves to counterbalance the weight of the hood to render it easy to lift to open position and to normally hold the same in its open position. While FIG. 1 illustrates a specific use for the device, it is to be understood that this is merely illustrative and that the counterbalance to be described may be employed in many diverse other environments.

Referring now to FIG. 2 to 4, the counterbalance strut 6 comprises a pair of telescopic tubular members, a large outer tube member 8 and a smaller or inner tube member 10. At their inner ends the tube members 8 and 10 are telescopically related, as shown and their relative diameters are such that an annular space 12 exists between the tubular members. A plug member 14 fits within the upper end of the tube 8 and is secured thereto, such as by the rounded bead 16 swaged into a corresponding groove in the plug and the plug defines an ear 18 having an opening 20 therethrough. Preferably, an elastomeric grommet 22 is positioned in the opening 20 for the reception of a suitable bolt 24 for securing the plug 14 to a closure or supporting structure therefor. The grommet 22 compensates for any slight misalignment between the bolt holes in the supporting structures and the eyelets in the plugs.

A plug 26, similar in all respects to the plug 14, is secured to the outer end of the inner tubular member 10 and is provided with the opening and grommet already described.

As is apparent from FIG. 2 of the drawings, the upper ear 18 is thicker than the lower ear and is of greater sectional area around the openings 20 than the area of the lower ear. Thus, it is obvious that the lower ear is much weaker than the upper, this being a desirable feature to predetermine which ear will fail upon undue shock loads being applied to the device. Knowing that the predetermined ear will fail first, that one can be so positioned in the final assembly with a vehicle that failure of that ear and the resultant sudden expansion of the device will result in the energy of the expansion being directed in a manner so that persons nearby will not be injured.

It is further to be noted that the grommets 22 in both ears extend outwardly beyond the opposite faces of those ears and serve to space the same from the heads of the mounting bolts and the adjacent vehicle structure. Thus, the grommets provide limited universal pivotal movement between the counterbalance device and the parts of the vehicle to which it is attached. This not only permits mounting to parts that are somewhat misaligned but also permits universal tilting where the axis of mounting to the closure does not always remain parallel to the axis at the other end, during closure movement.

Within the tubular members 8 and 10 is a compression spring 28, reacting against the plugs 14 and 26 to thereby tend to elongate the counterbalance strut. As will be obvious, from inspection of FIG. 1, the spring 28 serves effectively to counterbalance the weight of the hood 4.

The inner end of the outer tube 8 is reduced in diameter, as shown at 30, to about the outer surface of the member 10 so as to provide a free sliding fit thereon. The outer member 8 is also provided with an inwardly extending abutment in the form of an annular rib 32, rolled or otherwise formed therein, spaced from the end 30 and extending inwardly to about the outer surface of the member 10. The inner end of the member 10 is flared outwardly, as at 34 and is provided with a terminal cylindrical portion (as shown) of greater diameter than the tube 10, substantially into sliding engagement with the inner surface of member 8. It will be apparent that the abutment rib 32 serves as a stop means to limit elongation of the counterbalance device under the influence of spring 28 and that the flared end 34 and its terminal cylindrical portion, the rib 32 and the reduced end portion 30 all function as slidable guiding means between the members to maintain them in axial alignment. It is to be further noted that the distance between reduced end 30 and rib 32 is a substantial distance, thereby firmly aligning the members against undue tilting and constituting an efficient linear guide.

Referring now to FIGS. 5–9, a second form of the invention is shown therein. Similar parts to those shown in FIGS. 2–4 bear the same reference numerals. In this embodiment, an outer tube 36 is provided with a closure plug 38 at one end, similar to the plug 14 of FIG. 2, except that the ear 40 is centrally located rather than laterally offset. In like manner the inner tubular member 42 is provided with an end plug 44, likewise having its ear 46 centrally located. Within the telescopically related tubular members 36 and 42 is a pair of compression springs 48 and 50, concentrically arranged with the outer spring 48 being held in centered relation within the larger tube 36 by a suitable boss 52 on the plug 38. Inwardly from its inner end the outer member 36 is provided with inwardly directed abutments 54, similar to the rib 32 of FIG. 2, but comprising spaced inwardly deformed portions rather than a continuous rib (see FIG. 9). The projections 54 function in a manner similar to the rib 32 and are engaged by the flared end 56 of the inner tubular member 42 to limit extension of the counterbalance. The innermost end of the outer tubular member 36 is turned inwardly to define a radial flange 58 (see FIG. 7) having a notch 60 therein. A ring 62 of suitable plastic material is positioned against the flange 58, in the annular space 12 to serve as centering means for the tubular members and to function somewhat as an anti-friction bearing member. The ring 62 is not continuous but is split at 64 (see FIG. 8) with its ends spaced apart somewhat and with the space 65 therebetween in alignment with the notch 60 in flange 58.

Within the space 12 is a helical torsion spring 66, formed preferably of rectangular wire, having a hooked end portion 68 (see FIG. 5) extending between the ends of the split ring 62 and through the notch 60 of flange 58 to thus anchor one end of the torsion spring to the outer tubular member 36. The helical torsion spring 66 is so constructed that its inner diameter, when relaxed, is somewhat less than the outer diameter of the inner tubular member 42 and thus when assembled in the manner shown, the spring 66 normally tends to contract into tight frictional engagement with the tubular member 42.

The upper end of the torsion spring 66, as seen in FIG. 7, is turned outwardly, as shown at 70, and extends through a slot 72 in the outer tubular member 36 (see also FIG. 5). The end 70 extends outwardly through the slot 72 and through an opening 74 in a sleeve member 76, loosely and rotatably surrounding the outer tubular member 36.

FIG. 5 illustrates the general shape of the slot 72 as being generally circumferential but having an end portion 78 extending axially and defining a shoulder 80.

The sleeve 76 may obviously be manually manipulated by rotating the same in a direction to "unwind" the torsion spring 66, thus increasing its diameter and causing it to release its frictional grip on the inner tubular member 42. When the sleeve 76 is rotated from the position shown in FIG. 5 to move the end 70 of spring 66 to the left, this unwinding or releasing action occurs. Obviously, sleeve 76 and the end 70 of the spring can be moved axially somewhat and sufficiently to ride over the hump portion 82 of the slot 72 and end 70 can then be positioned behind the shoulder 80 to hold the spring in its unwound position, leaving the counterbalance free to extend or contract without restraint from the torsion spring. Obviously, the sleeve 76 may then be manually manipulated to remove the end 70 of the spring from the shoulder 80 and permit the spring 66 to again contract into tight frictional gripping relationship to the inner tubular member 42. Since the spring 66 is fixed at one end to the outer tubular member 36, when it frictionally grips the inner tubular member in the manner described, it serves as a friction lock preventing telescopic extension or compression of the counterbalancing device. However, if the strut is so locked in its extended position, to hold hood 4 open, for example, undue force or pressure on the hood will cause the spring 66 to slip relative to tube 42 and thus prevent damage to the hood and/or strut.

While a limited number of specific embodiments of the invention have been shown and described, the same are merely illustrative of the principles involved and other forms will be apparent to those skilled in the art.

I claim:

1. A counterbalance for a movable closure on a structure comprising; a pair of tubular members, with their inner ends in coaxial telescoped and sliding relation; means at the outer end of each member defining an abutment and comprising securing means for securing said ends to a closure and a closure supporting structure, respectively; compression spring means within said tubular members, reacting at its opposite ends against said abutments whereby to urge said tubular members apart; and cooperating stop means on said tubular members for limiting relative outward movement thereof, the relative diameters of said tubular members being such as to provide an annular space therebetween; said stop means comprising an annular inwardly extending integral shoulder on the outer of said members, spaced from the inner end thereof, and an outwardly flared inner end on the inner member engageable with said integral shoulder; at least the inner end of said outer member being of reduced diameter to slidably engage the outer surface of the inner member, said securing means each comprising a longitudinally extending ear having an opening therethrough, an elastomeric grommet in each opening, and a portion of said grommet spacing said ears from connected structures to provide limited universal movement relative thereto; one of said ears being of less sectional area than the other whereby said one ear will fail first when said counterbalance is subjected to undue force.

2. A counter balance as defined in claim 1 including selectively operable locking means in said annular space for locking said tubular members against relative telescoping movement.

3. A counterbalance as defined in claim 2 wherein said locking means comprises a helical torsion spring surrounding the inner of said tubular members and of a diameter to normally contract into tight frictional engagement therewith; one end of said spring being secured to the outer member; and manually operable means, accessible from the exterior of the outer member, for moving the other end of said spring in a direction to increase the diameter thereof to thereby release its frictional grip on the inner member.

4. A counterbalance as defined in claim 3 including means retaining said spring at the inner end of the outer member.

5. A counterbalance as defined in claim 4 wherein said one end of said torsion spring is secured to said outer member at the inner end thereof; said manually operable means comprising a rotatable sleeve around the outer member and having an opening therethrough; a generally circumferential slot through the inner tubular member radially inwardly of said opening, the said other end of said spring extending generally radially outwardly and through said slot and opening.

6. A counterbalance as defined in claim 7 wherein one end of said slot comprises an axially extending portion adapted to engage and hold said outwardly bent end of said spring when said spring is radially expanded.

7. A counterbalance as defined in claim 1 wherein said elastomeric means for spacing said ears comprise end portions of said grommets extending outwardly of opposite sides of said ears.

8. A counterbalance as defined in claim 1 wherein said compression spring means comprises at least two compression springs, one axially within the other.

9. A counterbalance as defined in claim 1 including an integral cylindrical axial extension at the outer periphery of said flared inner end on the inner member.

* * * * *